Dec. 15, 1953

O. X. HEINRICH 2,662,610

APPARATUS FOR CENTRIFUGAL SEPARATION
OF SUSPENDED PARTICLES

Filed Aug. 4, 1950

INVENTOR.
Oswald X. Heinrich.
BY
Knight & Rodgers
ATTORNEYS.

Dec. 15, 1953 — O. X. HEINRICH — 2,662,610
APPARATUS FOR CENTRIFUGAL SEPARATION
OF SUSPENDED PARTICLES

Filed Aug. 4, 1950

INVENTOR.
Oswald X. Heinrich
BY
Knight & Rodgers
ATTORNEYS.

Patented Dec. 15, 1953

2,662,610

UNITED STATES PATENT OFFICE 2,662,610

APPARATUS FOR CENTRIFUGAL SEPARATION OF SUSPENDED PARTICLES

Oswald X. Heinrich, Philadelphia, Pa.

Application August 4, 1950, Serial No. 177,622

4 Claims. (Cl. 183—80)

The present invention relates generally to apparatus for the separation of suspended particles from a stream of gas in which the particles are carried, and particularly to means for effecting such separation by centrifugal force. Although a single centrifugal separating unit may be used, the usual apparatus has a plurality of such units arranged in parallel.

The arrangement of a plurality of such separating units in parallel is a customary and well known design which is resorted to in order to keep the diameter of each separating unit at a relatively low value and thus obtain a correspondingly high separating efficiency. An increase in the number of units rather than in their size is resorted to in order to obtain apparatus adapted to handle larger volumes of gas. It is obvious that it is a general object of all such arrangements to provide a high efficiency of separation of particles from the gas stream. In the case of multiple unit separators, there is some loss of this efficiency as a result of re-entrainment of the particles in the gas stream after they have once been separated from it. This is particularly true where a large number of separating units discharge the separated material into a common hopper and there is an opportunity for some cross circulation between such units with the result that air or gas is withdrawn from the hopper by some of the units. This air so withdrawn may carry with it a certain portion of the extremely fine particles; and these re-entrained particles are usually introduced into the gas stream at a point such that they are not again completely removed from the gas stream.

Hence it becomes a general object of my invention to devise a centrifugal type of separator for removing suspended particles from a gas stream, in which there is no opportunity for re-entrainment of the particles after they have once been separated out.

It is also an object of my invention to devise a centrifugal type of separator in which the separated material and the stream of clean gas are maintained entirely apart from each other after the initial separation of the particles from the gas stream.

The above and other objects of my invention have been attained by arranging a plurality of tubular separating units with their axes parallel, each unit having a gas inlet at one end and a gas outlet at the other end and a particle outlet in a side wall through which the separated material is discharged from the unit. An upwardly extending housing surrounds at least a portion of each of the separating units in order to receive the separated material which is discharged from the unit through said particle outlets. This housing extends in general transversely of the main gas duct in which the separating units are placed and operates to isolate separated material from the gas stream both before it enters and after it leaves the separating units. The particle outlet in each separating unit is preferably located at such a point in the side wall of the unit that the stream of separated material is directed downwardly against the wall of the housing at a small angle of incidence, thus keeping the separated material in a relatively concentrated stream and minimizing wear upon the housing wall which acts as a guide for the stream of material.

The axes of the tubes may be generally horizontal or inclined thereto with the gas inlet at either the upper or lower end of the tube. However, I prefer to incline the tube so that the gas inlet is at the lower end of the tube and the tube is inclined upwardly in the direction of gas flow at an angle steeper than the angle of repose of the material being separated.

It is also preferable to place two such particle outlets in the side wall of each separating unit, one being placed adjacent the means for producing the swirling motion of the gas at the inlet end of the tube, and the other outlet being placed near the other end of the separating chamber. Two upwardly extending housings are then provided, one housing receiving materials discharged from all of the particle outlets at one end of a row of separating units, while the other housing receives only material discharged from the particle outlets at the other end of the separating units.

How the above objects and advantages of my invention, as well as others not specifically referred to herein, are attained will be more readily understood by reference to the following drawings, in which.

Figure 1:
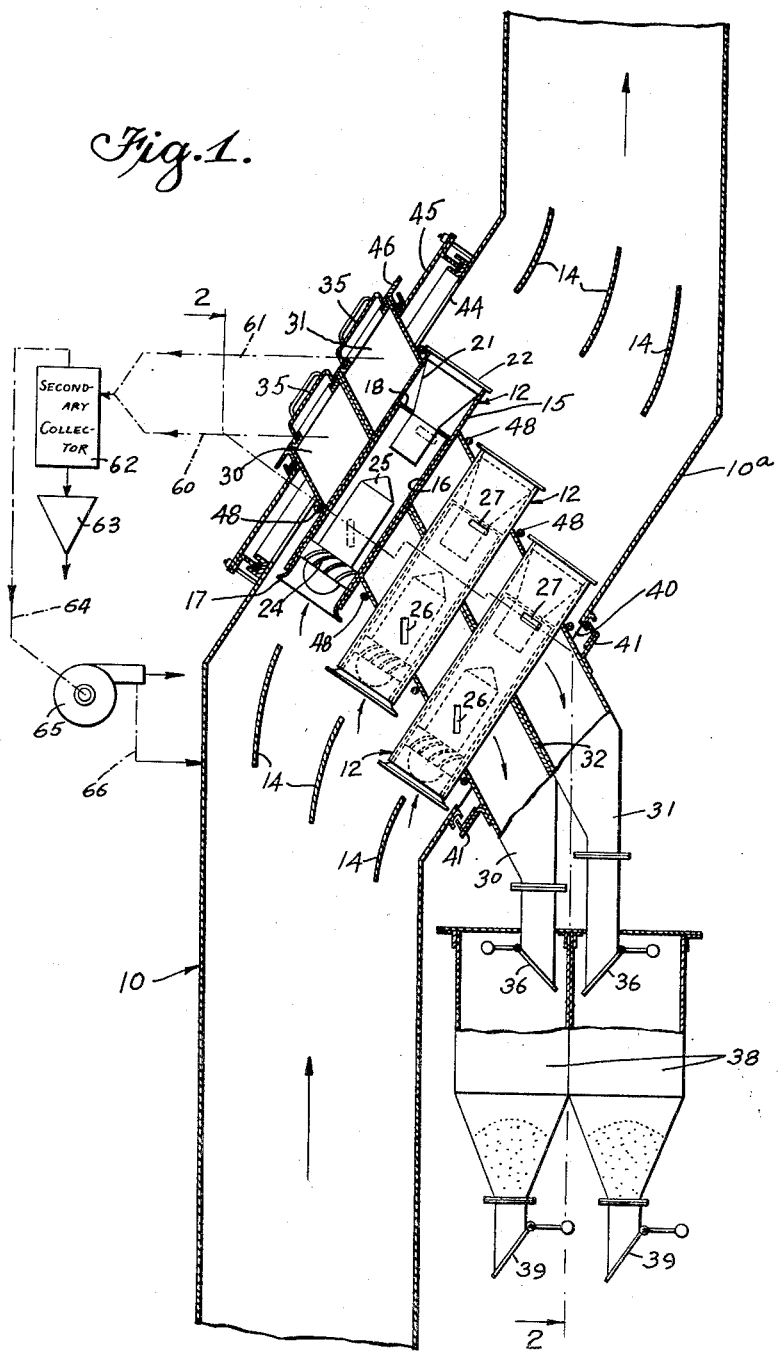
Fig. 1 is a vertical section through a centrifugal separator constructed according to my invention.

In Fig. 1, there is indicated generally at 10 a gas duct which has an inclined section 10a within which the centrifugal separator units are located.

These units, indicated generally at 12 are arranged one above another in upwardly extending rows. In the arrangement shown in Fig. 1, there are three such units in a single row. In order to increase the capacity of the entire apparatus, a number of such upwardly extending rows may be arranged side by side, there being three such rows in side-by-side relation shown in Fig. 2. Although the centrifugal separating apparatus completely fills the gas duct, the duct may be considered a continuous member which delivers the gas and suspended particles to one end of the separating units and removes the clean gas from the outlet end of the separating units. In order to equalize the gas distribution throughout the cross section of the duct, various directional vanes 14 may be provided, of any suitable type, adjacent one or both ends of the separating units.

Figure 4:
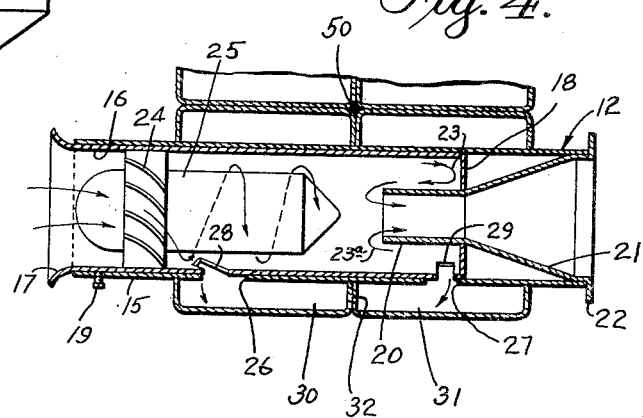
Fig. 4 is a longitudinal section through a single separating unit.

A single separating unit 12 is shown in longitudinal cross section and in somewhat greater detail, in Fig. 4. It includes an external sleeve or guide 15 which is stationarily mounted in the manner which will be described later. Guide 15 is preferably a cylinder in order to receive with a snug sliding fit an inner cylindrical member 16 which defines the chamber within which the separation of the suspended particles from the gas stream takes place. A cylindrical shape is preferred for these members because of economy in manufacture, ease of fitting and adjustment, and other advantages; but the operation of the units is not dependent upon a circular cross section for these elements. The end of inner tube 16, which is the gas inlet end, is preferably flared at 17 to assist in guiding gas into the tube. Tube 16 may be secured in place in guide 15 by a locking set screw 19 or any other suitable means.

At the other or inner end of cylinder 16 is an annular end wall 18 which extends transversely of the tube and is provided with a concentric opening of substantially smaller diameter than the internal diameter of tube 16.

This central opening in end plate 18 receives a gas outlet member which is made in two sections. One section 20 is cylindrical and fits snugly within the central opening in end wall 18. To section 20 is joined frusto-conical section 21 which in general extends from end wall 18 to the end of guide 15. The outer end of the outlet member is preferably flanged at 22 in order to provide a snug gas-tight fit with guide 15 and also to provide means which limits the inward movement of the outlet member with respect to the guide.

In order to provide a swirling motion to the gas stream after it enters the separating chamber, an annular row of vanes 24 is provided near the inlet end of the tube. These vanes may be of any suitable type used in mechanical separators of this type. The outside diameter of the vanes is such that they slide snugly into tube 16, and they may be held in position in any suitable manner. The vanes support a central cylindrical core 25 with rounded or otherwise streamlined ends, the core cooperating with the wall of tube 16 to define an annular space within which the gas stream whirls after it leaves vanes 24.

As a result of this whirling motion which is imparted to the gas stream, the particles suspended in the gas stream, whether these particles are solid or liquid phase, are thrown against the inside of tube 16. At the same time the whirling gas stream moves axially along the tube, being concentrated in the vicinity of the tube wall. As the whirling gas stream reaches end wall 18 it is forced to contract and turn through 180° (at 23) and move axially in the opposite direction, now flowing closely around the outside of outlet tube 20. As the gas stream reaches the open end of tube 20 it again reverses its direction of flow (at 23a) and moves outwardly through cylindrical section 20 and then through the flaring section 21 which provides an outlet for the cleaned gas from the separating unit. Both these 180° changes in direction assist in separating material from the gas stream.

The particles of separated material are removed from the separating unit through one or more openings in the walls of the unit, these particle outlets being located intermediate the end of the unit 12. For this purpose, guide 15 is provided with two openings 26 and 27 and inner tube 16 is provided with corresponding openings 28 and 29 which may be brought respectively into registration with the fixed openings in the guide tube. Openings 26 and 28 are located near the inlet end, preferably just beyond vanes 24 in such a position that the two openings provide a particle outlet located at the position where the particles are first thrown against the inner face of tube 16 by the swirling motion of the gas stream imparted by vanes 24. Obviously, the coarser or heavier particles are thrown out first. Hence the total amount of material thrown out through this first particle outlet depends to a large extent on the character of the material suspended in the gas stream; but in general it consists of the coarser particles and may comprise the bulk of the material separated.

The second particle outlet provided by openings 27 and 29 when in registration is located adjacent end wall 18. Material which has not been thrown out through the other particle outlet travels along with the whirling gas stream and is thrown out of the separating chamber through this second particle outlet. Since very fine particles in suspension require longer to reach the periphery of the whirling gas, the finer particles are chiefly thrown out through this second opening. Under some conditions, only one particle outlet may be desired in which case the first one at 26—28 is omitted and all particles are removed through the outlet at openings 27—29.

Guides 15 are supported by and connected to housings 30 and 31 which are hollow rectangular box-like members that extend upwardly. Housing 30 surrounds a portion of guide 15 and the separating chamber to include the first particle outlet provided by openings 26 and 28 so that material discharged through this outlet is received by the housing. The housing extends upwardly around all of the units 12 in an upwardly extending row and thus receives the dust discharged from all of these tubes through the corresponding particle outlets. In a similar manner housing 31 surrounds a portion of guide 15 and the separating chamber formed by tube 16 to include the particle outlet at the other end of the tube formed by openings 27 and 29. In a similar manner, the housing 31 extends upwardly to receive dust discharged from all of the separating units in a vertical row through the corresponding particle outlets.

Figure 2:
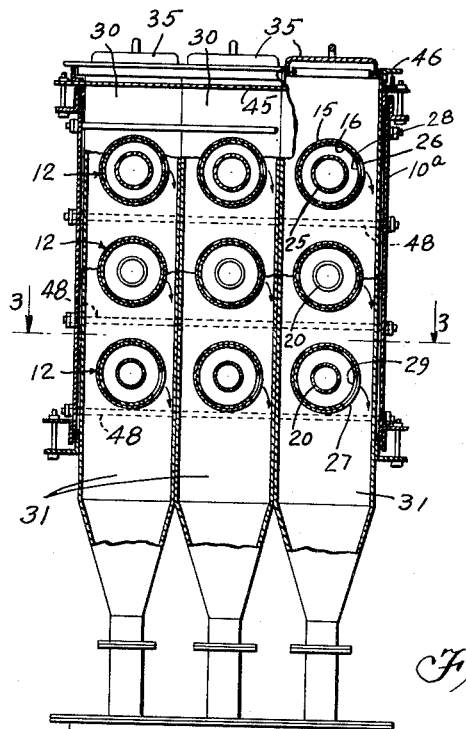
Fig. 2 is a transverse section on line 2—2 of Fig. 1.

While its is preferable that two housings be supplied as shown, yet it will be understood that it is within the scope of my invention to modify the structure by eliminating the two adjoining walls of the housings at 32 with the result that both housings are converted into a single one large enough to receive material from both particle outlets. A single housing only is needed in case only a single particle outlet is provided. There are a pair of housings 30 and 31 for each of the upwardly extending rows of separating units 12. There being three such rows of separators, as shown in Fig. 2, there are three such pairs of housings 30 and 31, as shown in Fig. 3.

Each housing 30 and 31 is closed at its upper end by a removable door 35 which affords access to the housing for cleaning or repair of the parts should this become necessary. At their lower ends, the housings are closed by a weighted tipping valve 36, or other suitable type of valve, which periodically allows the collected material to be discharged from the lower end of the housing by gravity and automatically closes for the interval between such discharges to prevent entry of air into the housing. The material discharged from the housing may be delivered into any suitable type of receptacle or to a conveyor unit; but as typical of such devices, there is shown a common storage hopper 38 beneath the outlets to all housings 30 which receives and stores the separated material. A similar hopper 38 receives material from housings 31. Each hopper 38 is provided with a discharge valve 39 at its lower end through which the material is removed.

Figure 3:
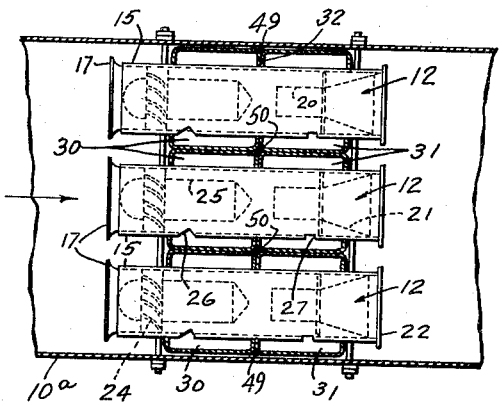
Fig. 3 is a section parallel to the axes of the separating units as on line 3—3 of Fig. 2.

The entire assembly of separating units and dust housings is supported from the walls of gas duct 10, as may be seen in Figs. 1 and 3. On the under side of gas duct 10 is an opening 40 through which housings 30 and 31 project. An angular flange structure 41 is removably attached like a collar to the outside of the housings and provides a means for forming a gas-tight seal with the walls of the gas duct. On the upper side of the gas duct, is a larger opening 44 which preferably is made sufficiently large that the entire assembly of separator units can be lifted bodily through the opening for removal from the duct or can be lowered through the opening for installation. The opening 44 is closed by a hatch structure 45 designed to provide a gas-tight seal with the walls of the duct and which is provided with a central opening through which housings 30 and 31 project. A gas-tight seal is likewise provided at this point between hatch 45 and a flange structure 46 attached to and around the upper end of the housings. Tie rods 48 extend transversely across the gas duct and give added rigidity to the structure as well as provide means of carrying a portion of the weight of the interior structure to the outer walls of the gas duct.

A gas-tight fit is assured between housings 30 and 31 and the walls of duct 10 by providing packing at 49, as shown in Fig. 3. Similar packing is provided at 50 between the housings to eliminate any possible gas flow between them.

The axes of units 12 are all parallel to each other and are shown inclined upwardly to the horizontal in the direction of gas flow, which is the preferred arrangement of these elements. Also, they are preferably disposed at an angle steeper than the angle of repose of the material being separated so that any material separated out but not discharged from the tubes through openings 28 and 29 slides downwardly and out through the gas inlet 17. Such material falls into the stream of particle laden gas, where the particles are re-suspended and can be again separated from the gas stream.

It is within the scope of my invention to change this angle and to make the tubes substantially horizontal or inclined downwardly in the direction of gas flow. In the latter case, the location of opening 29 may be altered, or the opening may be elongated in order to place a particle discharge opening at the lowest point of the separating chamber through which material can be discharged by gravity. In any one of these positions, the axes of units 12 may be characterized as being disposed at an angle to the vertical. It will likewise be appreciated that it is preferable to dispose housings 30 and 31, when viewed as in Fig. 1, at an angle to the horizontal which is steeper than the angle of repose of the material being separated. This prevents the separated material from piling up in the housings and insures that material flows freely through them at all times under the influence of gravity.

Openings 26 and 27 in fixed guides 15 are preferably larger than openings 28 and 29 respectively in order to insure ease of registration of the two sets of openings and that the net opening is not smaller than either of openings 28 or 29. These two particle discharge outlets from units 12 are located in the side wall of the separating unit well above the lowest point of the tube. The openings are on that side such that the revolving stream of gas (rotating clockwise in Fig. 2) throws the separated particles through the discharge outlets and against a side wall of a housing at a relatively small or flat angle of incidence, as indicated by the flow arrows in Fig. 2. This arrangement has the advantage that the separated particles are concentrated in a stream which flows down the side of the wall and abrasion on the wall is substantially reduced below that which would occur if the particles were thrown against the wall at right angles. Some dusts that might be separated have abrasive characteristics that would result in a substantial amount of wear if this latter condition existed.

Although the apparatus as so far described is completely operable, its efficiency may under some circumstances be improved by withdrawing from the housings a small fraction of the total gas stream. Since apparatus for this purpose is known in the art, it is shown only diagrammatically by dot-dash lines in Fig. 1 and is described but briefly.

At some convenient point on each housing 30 and 31 there is connected an exhaust duct 60 and 61 respectively. The ducts from all the housings are combined together and led into a secondary separator 62, which may be of any conventional design. For example it may be a single cyclone separator, but other types of mechanical separators or filters may be used. The dust separated out in the collector 62 is discharged at the bottom and is collected in a hopper 63 while the clean gas is removed through duct 64. From the collector the gas goes through duct 64 to fan 65 which may discharge the clean gas to the atmosphere or through duct 66 back into main gas duct 10 at a point ahead of the separators 12.

The quantity of gas thus withdrawn is preferably in the neighborhood of 10 to 15% of the entire volume of gas passed through duct 10. However, this fraction may be changed as found most desirable.

Having described a preferred embodiment of my invention and certain variations therein, it will be understood that other modifications may occur to persons skilled in the art without departing from the spirit and scope of my invention. Consequently, it is desired that the foregoing description be considered as illustrative of, rather than limitative upon, the appended claims.

I claim:

1. In apparatus for separating suspended particles from a stream of gas by centrifugal action, the combination comprising: a fixed guide member; a cylindrical separating chamber slidable endwise into the guide member and having a gas inlet at one end and an annular end wall at the other end, the chamber having in a side wall an opening registrable with an opening in the guide member to provide a particle outlet for separated material; means within the chamber to produce a swirling motion of the gas stream; a gas outlet member having a cylindrical section projecting inwardly of the separating chamber from said end wall and spaced from the side wall of the separating chamber, and having a frusto-conical section flaring outwardly beyond said end wall; and a particle collecting member partially surrounding the guide and separating chamber to receive material discharged through the particle outlet.

2. In apparatus for separating suspended particles from a stream of gas by centrifugal action, the combination comprising: a fixed guide member; a cylindrical separating chamber slidable endwise into the guide member and having a gas inlet at one end and an annular end wall at the other end, the chamber having in a side wall a pair of axially spaced openings, one near the inlet end and one near the annular end wall, registrable with corresponding openings in the guide member to provide a pair of particle outlets for separated material; means within the chamber to produce a swirling motion of the gas stream; a gas outlet member having a cylindrical section projecting inwardly of the separating chamber from said end wall and spaced from the side wall of the separating chamber, and having a frusto-conical section flaring outwardly beyond said end wall; and a particle collecting member partially surrounding the guide and separating chamber at each of the particle outlets to receive separately material discharged through the associated particle outlet.

3. In apparatus for separating suspended particles from a stream of gas by centrifugal action, the combination comprising: a gas duct; a pair of housings extending transversely across and beyond the duct at opposite sides thereof; particle discharge means at one end of each housing; access means at the opposite end of each housing and outside the gas duct; a plurality of cylindrical guides each extending transversely across and beyond the two housings, each guide having a particle outlet opening into each housing; and a separating chamber of circular cross-section slidably received in each guide and having particle outlets in registration with the particle outlets of the guides, the inlet ends of all the separating chambers opening to the gas duct at one side of the housings and the outlet ends opening to the gas duct at the other side of the housings, and the pair of housings with the associated guides and separating chambers being removable as a unit through one wall of the gas duct.

4. In apparatus for separating suspended particles from a stream of gas by centrifugal action, the combination comprising: a gas duct; a housing extending transversely across and beyond the duct at opposite sides thereof; particle discharge means at the lower end of the housing; access means at the opposite end of the housing and outside the gas duct; a plurality of cylindrical guides each extending transversely across and beyond the housing, each guide having a particle outlet opening into the housing; and a separating chamber of circular cross-section slidably received in each guide and having a particle outlet in registration with the particle outlet of the guide, the inlet ends of the separating chambers opening to the gas duct at one side of the housing and the outlet ends opening to the gas duct at the other side of the housing, and the housing with the associated guides and separating chambers being removable as a unit through one wall of the gas duct.

OSWALD X. HEINRICH.

References Cited in the file of this patent

UNITED STATES PATENTS

| Number | Name | Date |
| --- | --- | --- |
| 1,735,298 | Pfeffer | Nov. 12, 1929 |
| 1,970,077 | Collins | Aug. 14, 1934 |
| 2,082,242 | Bowen | June 1, 1937 |
| 2,201,301 | Richardson | May 21, 1940 |

FOREIGN PATENTS

| Number | Country | Date |
| --- | --- | --- |
| 402,693 | Great Britain | Dec. 7, 1933 |
| 580,936 | Great Britain | Sept. 25, 1946 |
| 891,452 | France | Dec. 11, 1943 |